April 2, 1963  F. G. KRAFFT ET AL  3,083,535
HYDRAULIC SERVO SYSTEM
Filed Sept. 12, 1961  3 Sheets-Sheet 1

INVENTOR.
FREDERICK G. KRAFFT
WALTER ERNST
BY
Toulmin & Toulmin
ATTORNEYS

INVENTOR.
FREDERICK G. KRAFFT
WALTER ERNST
BY
Toulmin & Toulmin
ATTORNEYS

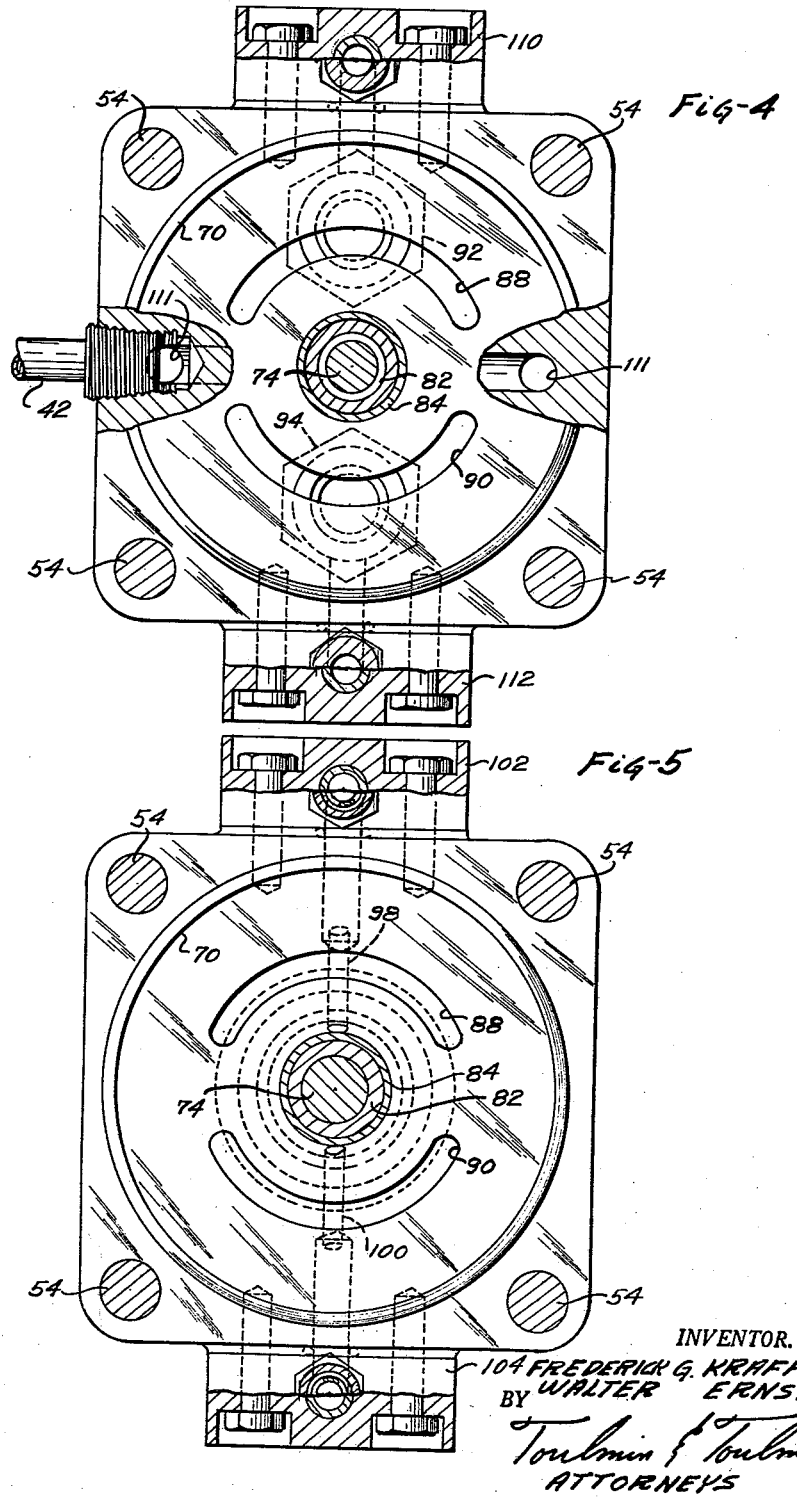

3,083,535
HYDRAULIC SERVO SYSTEM
Frederick G. Krafft and Walter Ernst, Springfield, Ohio, assignors to Thompson Grinder Co., Springfield, Ohio, a corporation of Ohio
Filed Sept. 12, 1961, Ser. No. 137,634
7 Claims. (Cl. 60—52)

This invention relates to a hydraulic servo system and is most particularly concerned with a hydraulic servo system in which the control of the speed and the direction of movement of the controlled member is effected by controlling the displacement of a variable displacement pump. This invention is also concerned with the construction of a pump for use as a servo pump in a system of the nature referred to.

In connection with power operated machinery, such as machine tools and the like, a great many servo systems are employed and these are quite often of the hydraulic type. Ordinarily, with a hydraulic servo motor, the control of the delivery of fluid to the motor actuating the movable member is accomplished by way of a servo valve which determines the rate and direction of delivery of the hydraulic fluid. Such systems are satisfactory but the provision of the servo valve in such a system is expensive and the system requires considerable piping and other fittings for the installation thereof.

With the foregoing in mind, a primary object of the present invention is the provision of a novel hydraulic servo system in which the customary servo valve is completely eliminated.

Another object of this invention is the provision of a hydraulic servo system in which the entire control of the movable member is effected by controlling the displacement of a variable displacement reversible delivery fluid pump.

Still another object of this invention is the provision of a novel variable delivery, reversible delivery fluid pump especially adapted for use in a servo system of the nature referred to.

It is also an object of this invention to provide a novel servo system especially adapted for use with machine tools and the like, which is extremely simple and compact and which can be built into or combined with a machine tool readily and with a minimum of piping and other fittings.

The several objects referred to above, as well as still other objects and advantages of the present invention, will become more apparent upon reference to the following specification taken in connection with the accompanying drawings in which:

FIGURE 4 is a sectional view indicated by line 4—4 on FIGURE 2;

FIGURE 5 is a sectional view indicated by line 5—5 on FIGURE 2; and

FIGURE 6 is a fragmentary plan view showing a lever connected with the pump control rod.

Figure 1:
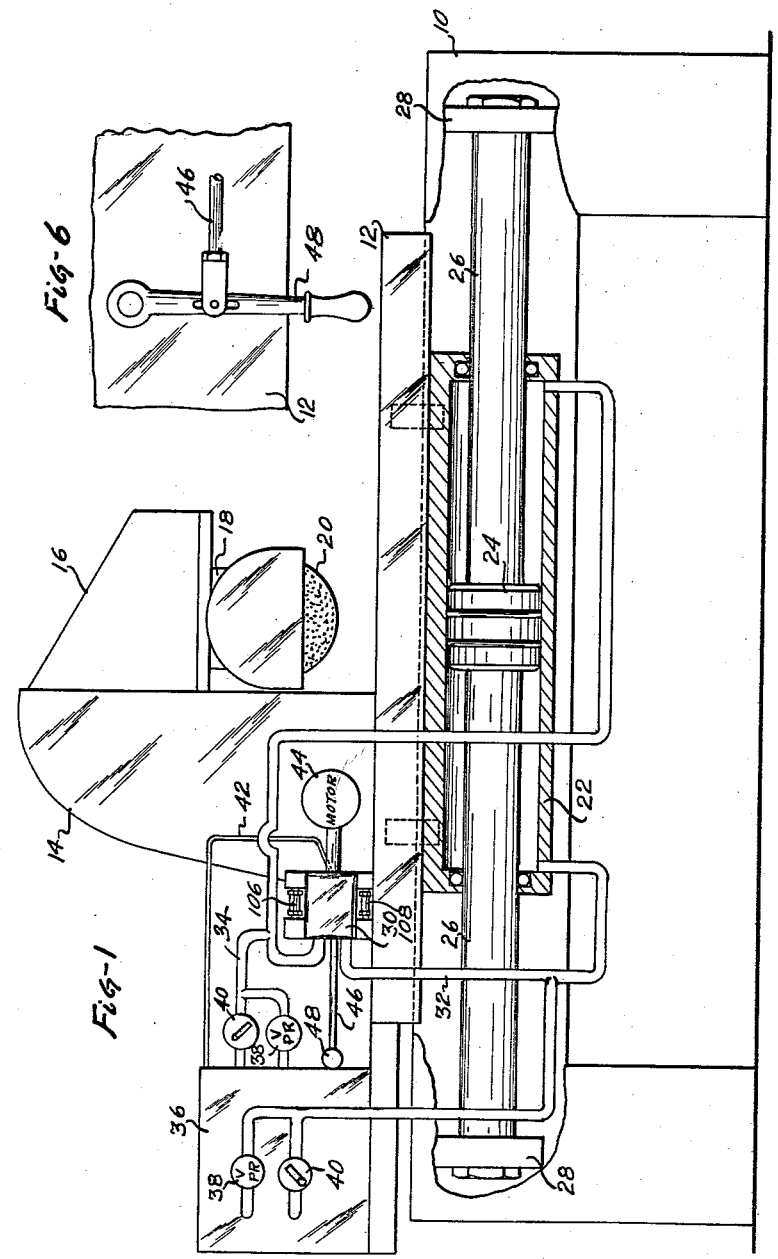
FIGURE 1 is a more or less diagrammatic view of a grinding machine having a reciprocating work table under the control of a hydraulic servo system according to this invention.
Figure 2:
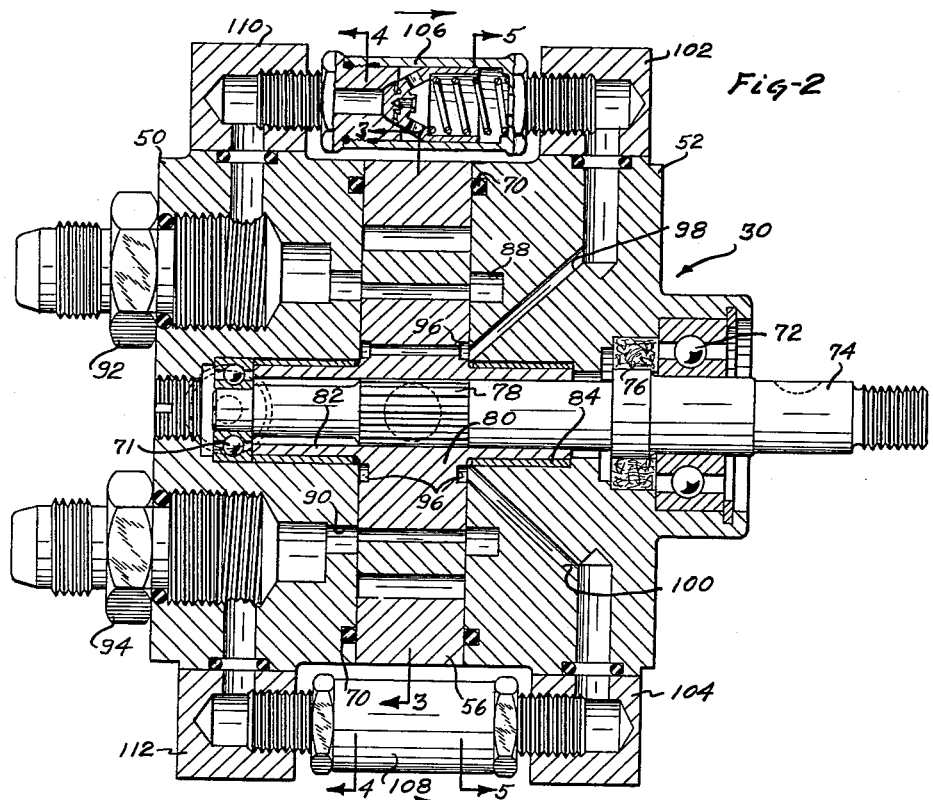
FIGURE 2 is a longitudinal vertical section taken through the novel hydraulic pump that forms a part of the servo system of FIGURE 1.

Referring to the drawings somewhat more in detail, the grinding machine illustrated in FIGURE 1 has a bed 10 on which is reciprocably supported the table 12 on which workpieces to be operated are to be supported.

Adjacent bed 10 is a column 14 that carries a saddle 16, from which is suspended a wheel head 18 that carries the motor driven grinding wheel 20.

Saddle 16 is vertically movable in column 14, while wheel head 18 is movable transversely in saddle 16. These movements, in combination with the reciprocating movement of table 12, permit the operating of workpieces in any desired manner.

Located in bed 10 and attached to table 12 is a cylinder 22, and located in the cylinder is a piston 24 having rods 26 extended therefrom in opposite directions and fixed to the bed at 28. It will be evident that a reversible supply of fluid to the opposite ends of cylinder 22 will bring about reciprocation of table 12 on bed 10.

For so reversibly supplying pressure fluid to cylinder 22, there is mounted on table 12, so as to reciprocate therewith, a servo pump 30 having a connection by way of a first conduit 32 with one end of cylinder 22 and a connection by way of a second conduit 34 with the other end of cylinder 22. Each conduit, 32 and 34, communicates with a reservoir 36 through a pressure relief valve 38 and a check valve 40 opening away from the tank. Pump 30 also has a slippage or leakage line 42 running from the pump back to tank 36.

Pump 30 is variable in delivery and reversible as to direction of delivery while being driven in one and the same direction by a motor 44. The control of the rate and direction of delivery of pump 30 is accomplished by a shift rod 46 extending from the pump and which has actuating means connected therewith, such as the lever 48, which is pivoted to table 12 so that when lever 48 is moved to shift the pump off center, the following movement of the table 12 will tend to return the pump to center by shifting the pivot point of the lever in the same direction as the lever was initially moved thereby to restore the lever to its original position of angularity relative to table 12.

The construction of the pump 30 will be seen more clearly in FIGURES 2 through 5. In these figures, it will be seen that the pump has end members 50 and 52, which are secured together by bolts 54. Located between end members 50 and 52 is a block 56 in which is located a shiftable cylinder block 58. Cylinder block or stator 58 is generally rectangular and has machined flats 60 at four corners, which engage corresponding machined flats 62 inside member 56. The machined flats engage each other and slidably support cylinder block or stator 58 in member 56 and, at the same time, divide the inside of member 56 into four compartments about the cylinder block or stator, said compartments being indicated at 64a, 64b, 64c and 64d. These compartments are sealed from each other and at least compartments 64a and 64b are adapted for being pressurized by fluid introduced through ports 66 and 68, respectively, which extend through the wall of cylinder block 58.

In addition to the said compartments being sealed from each other, sealing rings 70 seal between member 56 and end members 50 and 52 so that the inside of the pump is completely sealed.

The end members 50 and 52 support, by means of the antifriction bearings 71 and 72, a pump drive shaft 74. This pump drive shaft is sealed to member 52 by seal 76 and has a center portion at 78 provided with an external spline.

The external spline 78 on shaft 74 engages an internal spline on a rotor 80 that has a close running fit between end members 50 and 52. This rotor has the tubular extensions 82 projecting therefrom in opposite directions, which are supported in end members 50 and 52 by the sleeve bearings 84.

Figure 3:
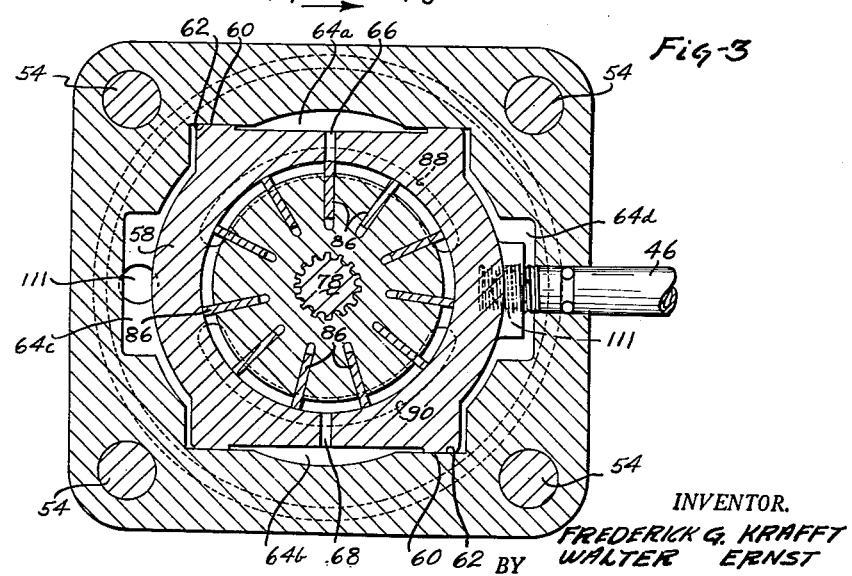
FIGURE 3 is a transverse section indicated by line 3—3 on FIGURE 2.

As will be seen in FIGURE 3, the rotor 80 is provided with radial slots, in which are fitted vanes 86 that divide the space around the rotor into pumping or motor chambers.

Communication is had with the said pumping chambers by means of arcuate ports 88 and 90 provided in end members 50 and 52 and best seen in FIGURES 4 and 5. These arcuate ports communicate with pipe connectors 92 and 94 carried by member 50 and which connectors are connected to the previously mentioned conduits 32 and 34.

The slots in which the vanes 86 are slidable communicate at their inner ends with annular passage means 96 in the rotor, which, in turn, communicate with passages 98 and 100 provided in end member 52. These last mentioned passage means communicate with blocks 102 and 104, respectively, to which are connected check valves 106 and 108, respectively, which, in turn, at their other ends are connected with blocks 110 and 112, respectively, that provide communication of the check valves with the passages in member 50 leading to the aforementioned connectors 92 and 94. The check valves 106 and 108 open from left to right and this provides an extremely compact arrangement whereby the inner ends of the vane slots of the rotor are always provided with pressure regardless of the direction of delivery of presure fluid from pump 30.

To control the delivery of fluid from pump 30, cylinder block 58 has connected thereto the aforementioned rod 46, which can be availed of for positioning the cylinder block in a position of exact concentricity with the rotor 80, in which case there is no delivery from the pump, or for shifting the cylinder block in respectively opposite directions from this neutral position for respectively opposite directions of delivery of pressure fluid from the pump.

When the cylinder block is shifted in one direction from its neutral position, the upper side of the rotor will be under pressure, and this pressure will be transmitted through port 66 to compartment 64a and will exactly balance out the pressures being exerted on the inside of the cylinder block at the top so that free movement of the cylinder block will always be had. Similarly, when the cylinder block is shifted in the opposite direction from its neutral position, the lower half on the inside will be under pressure and this pressure will be communicated through port 68 into compartment 64b and again balance out the forces on the cylinder block.

The compartments 64c and 64d are never under pressure but are always at exhaust pressure and are communicated with slippage line 42 by the ports 111.

From the foregoing, it will be appreciated that the adjustment of rod 46 controls the rate and direction of fluid to cylinder 22 and thus controls the rate and direction of movement of table 12. The described arrangement is thus a simple hydraulic servo system but does not require servo valves or complicated piping arrangements or the like.

The arrangement is easy to use and the table will follow the movements of the control rod and lever closely.

The relief valves 38 prevent excessive pressures from developing anywhere within the system, and the check valves 40 provide for makeup of any leakage in the system. The system is thus safe and can be readily adapted to any requirements, and it is extremely simple and inexpensive.

It will be understood that the terms "cylinder block" and "stator" refer to the same element, namely, a member having a bore therein forming a cylinder in which the rotor rotates and which bore member does not rotate.

It will further be understood while there has been substantially disclosed a single reciprocating motor structure, two separate single acting motors could be employed and equivalent results would be had. Still further, the controlled motor or motors could be in the form of a rotary motor or motors and exactly the same results would be had. A rotary motor or motors, for example, could be connected with the reciprocating member by way of gear and rack means so that the same control of the servo pump would be had.

It will be understood that this invention is susceptible to modification in order to adapt it to different usages and conditions and, accordingly, it is desired to comprehend such modifications within this invention as may fall within the scope of the appended claims.

We claim:

1. In a hydraulic servo system; a fluid motor comprising a stationary part and a reciprocable part, a reversible delivery-variable delivery pump connected to opposite sides of said motor, said motor having equal displacements in both directions of movement, said pump including a shiftable member in the pump movable for controlling the rate and direction of delivery of said pump, and a shifter element connected to said shiftable member and extending from the pump to control the shiftable member and thus to control said motor, a reservoir, a check valve opening from the reservoir to each side of the motor, and a relief valve between each side of the motor and the reservoir, said pump and said shifter element being carried; by the said reciprocating part of said motor.

2. In a hydraulic servo system for controlling the movement of a reciprocating member relative to a second member; a cylinder connected to one of said members, a piston in the cylinder connected to the other of said members, and having equal opposed areas, a reversible delivery-variable delivery pump connected in closed circuit between said areas and mounted on said reciprocating member, said pump having a shiftable stator therein movable for controlling the rate and direction of delivery of the pump, and a control element connected with said stator and projecting from said pump for the direct control of the position of said stator, there being conduits connecting said pump with one of said piston and cylinder.

3. In a hydraulic servo system for controlling the movement of a reciprocating member relative to a second member; a cylinder connected to one of said members, a piston in the cylinder connected to the other of said members and having equal opposed areas, a reversible delivery-variable delivery pump connected in closed circuit between said areas, said pump having a shiftable stator therein movable for controlling the rate and direction of delivery of the pump, a control element connected with said stator and projecting from said pump for the direct control of the position of said stator, conduits connecting the opposite sides of said pump with opposite ends of said cylinder, and means including a shifter element movably carried by said reciprocating member and operatively connected to said control element for shifting said stator.

4. In a hydraulic servo system for controlling the movement of a reciprocating member relative to a second member; a cylinder connected to one of said members, a piston in the cylinder connected to the other of said members and having equal opposed areas, a reversible delivery-variable delivery pump connected in closed circuit between said areas, said pump having a shiftable stator therein movable for controlling the rate and direction of delivery of the pump, and a control element connected with said stator and projecting from said pump for the direct control of the position of said stator, said cylinder being attached to said reciprocating member, said pump being mounted on said reciprocating member so as to move therewith and being connected by conduits with opposite ends of said cylinder, and means connected to said control element movable in the direction of movement of the reciprocating member to shift the stator of the pump to cause movement of fluid between said areas to bring about movement of the reciprocating member in the same direction as the said means.

5. In a hydraulic servo system for controlling the movement of a reciprocating member relative to a second member; a cylinder connected to one of said members, a piston in the cylinder connected to the other of said members and having equal opposed areas, a reversible delivery-variable delivery pump connected in closed circuit between said areas, said pump having a shiftable cylinder block therein movable for controlling the rate and direction of delivery of the pump, a control element connected with said cylinder block and projecting from said pump for the direct control of the position of said cylinder block, said cylinder being attached to said reciprocating member, said pump being mounted on said reciprocating member so as to move therewith and being connected by rigid conduits with opposite ends of said cylinder, there being a reservoir on said reciprocating member and connections from the reservoir to opposite sides of said pump, including check valves opening from the reservoir toward the pump and relief valves opening from the pump toward the reservoir, an operating lever movably mounted on the reciprocating member for movement therewith in the direction of movement of the reciprocating member, and said lever being connected to the control element so that movement of the lever in either direction relative to said reciprocating member will be accompanied by movement of the reciprocating member in the same direction.

6. In a hydraulic servo system for controlling the movement of a reciprocating member relative to a second member; a cylinder connected to said reciprocating member, a piston in the cylinder connected to the said second member and having equal opposed areas, a reversible delivery-variable delivery pump connected in closed circuit between said areas, said pump having a shiftable cylinder block therein movable for controlling the rate and direction of delivery of the pump, and a control element connected with said cylinder block and projecting from said pump for the direct control of the position of said cylinder block, there being rigid conduits connecting said pump with one of said piston and cylinder, said pump being mounted on said reciprocating member, and a lever pivoted to said reciprocating member and connected to said control element, said pump being so connected to said areas and said lever being so connected to said control element that manual movement of the lever in either direction will be accompanied by movement of the reciprocating member in the same direction.

7. In a hydraulic servo system for controlling the movement of a reciprocating member relative to a second member; a cylinder connected to said reciprocating member; a piston in the cylinder connected to the said second member and having equal opposed areas, a reversible delivery-variable delivery pump connected in closed circuit between said areas, said pump having a shiftable cylinder block therein movable in the direction of movement of said reciprocating member for controlling the rate and direction of delivery of the pump, and a control element connected with said cylinder block and projecting from said pump in the direction of movement of said reciprocating member for the direct control of the position of said cylinder block, there being rigid conduits connecting said pump with one of said piston and cylinder, said pump being mounted on said reciprocating member, and a manually operable lever pivoted to said reciprocating member on an axis normal to said direction of movement of said reciprocating member and connected to said control element, said pump being so connected to said areas that manual movement of the lever in either direction about its point of pivotal connection with said reciprocating member will be accompanied by movement of the reciprocating member in the same direction.

References Cited in the file of this patent

UNITED STATES PATENTS

| | | |
|---|---|---|
| Re. 19,694 | Ernst | Sept. 10, 1935 |
| 1,177,385 | Conradson | Mar. 28, 1916 |
| 1,685,760 | West | Sept. 25, 1928 |
| 2,230,055 | Ernst | Jan. 28, 1941 |
| 2,408,303 | Ernst | Sept. 24, 1946 |
| 2,669,935 | Tucker | Feb. 23, 1954 |
| 2,910,831 | Gatwood | Nov. 3, 1959 |
| 2,945,449 | Le Febvre | July 19, 1960 |